(12) United States Patent
Li et al.

(10) Patent No.: US 9,973,662 B2
(45) Date of Patent: May 15, 2018

(54) DETECTION OF SOLID COLOR FRAMES FOR DETERMINING TRANSITIONS IN VIDEO CONTENT

(71) Applicant: ARRIS Enterprises, Inc., Suwanee, GA (US)

(72) Inventors: Renxiang Li, Lake Zurich, IL (US); Faisal Ishtiaq, Chicago, IL (US); Alfonso Martinez Smith, Algonquin, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 571 days.

(21) Appl. No.: 14/595,660

(22) Filed: Jan. 13, 2015

(65) Prior Publication Data
US 2016/0205289 A1    Jul. 14, 2016

(51) Int. Cl.
  *H04N 5/14*  (2006.01)
  *G06T 7/00*  (2017.01)
  *G06K 9/00*  (2006.01)
  *H04N 21/44*  (2011.01)
  *H04N 21/81*  (2011.01)

(52) U.S. Cl.
  CPC ......... *H04N 5/147* (2013.01); *G06K 9/00765* (2013.01); *G06T 7/0079* (2013.01); *H04N 21/44008* (2013.01); *H04N 21/812* (2013.01)

(58) Field of Classification Search
  CPC ...................................................... H04N 5/147
  See application file for complete search history.

(56) References Cited

U.S. PATENT DOCUMENTS

| 5,151,788 A | 9/1992 | Blum |
| 6,100,941 A | 8/2000 | Dimitrova et al. |
| 2005/0002569 A1 | 1/2005 | Bober et al. |
| 2006/0187358 A1* | 8/2006 | Lienhart ........... G06F 17/30802 348/661 |
| 2008/0107343 A1 | 5/2008 | Sanford |

OTHER PUBLICATIONS

PCT Search Report & Written Opinion, Re: Application No. PCT/US2016/013295, dated Apr. 8, 2016.
Chu, Henry; "Texture Descriptors"; 2007 IEEE International Symposium on Circuits and Systems; Mar. 27-30, 2007.

* cited by examiner

*Primary Examiner* — James Pontius
(74) *Attorney, Agent, or Firm* — Stewart M. Wiener

(57) ABSTRACT

Particular embodiments detect a solid color frame, such as a black frame, that may include visible content other than the solid color in a portion of the frame. These frames may conventionally not be detected as a solid color frame because of the visible content in the portion of the frame. However, these solid color frames may be "functional" black or white frames, in that the solid color frames are performing the function of the solid color frame even though the frames include the visible content. The visible content may be content that may always be displayed on the screen even if the video content is transitioning to an advertisement. Particular embodiments use techniques to detect the functional solid color frames even when visible content appears in the solid color frames. Particular embodiments use color layout information and edge distribution information to detect solid color frames.

26 Claims, 8 Drawing Sheets

| HISTOGRAM BINS | SEMANTICS |
|---|---|
| LOCAL_EDGE[0] | VERTICAL EDGE OF SUB-IMAGE AT (0,0) - 78 EDGES —610 |
| LOCAL_EDGE[1] | HORIZONATAL EDGE SUB-IMAGE AT (0,0) - 0 EDGES —612 |
| LOCAL_EDGE[2] | 45 DEGREE EDGE OF SUB-IMAGE AT (0,0) - 5 EDGES |
| LOCAL_EDGE[3] | 135 DEGREE EDGE OF SUB-IMAGE AT (0,0) - 10 EDGES |
| LOCAL_EDGE[4] | NON-DIRECTIONAL EDGE OF SUB-IMAGE AT (0,0) - 0 EDGES |
| LOCAL_EDGE[5] | VERTICAL EDGE OF SUB-IMAGE AT (0,1) - 0 EDGES |
| ... | .. |
| ... | .. |
| ... | .. |
| LOCAL_EDGE[74] | NON-DIRECTIONAL EDGE OF SUB-IMAGE AT (3,2) - 0 EDGES |
| LOCAL_EDGE[75] | VERTICAL EDGE OF SUB-IMAGE AT (3,3) - 150 EDGES |
| LOCAL_EDGE[76] | HORIZONTAL EDGE OF SUB-IMAGE AT (3,3) - 300 EDGES |
| LOCAL_EDGE[77] | 45 DEGREE EDGE OF SUB-IMAGE AT (3,3) - 200 EDGES |
| LOCAL_EDGE[78] | 135 DEGREE EDGE OF SUB-IMAGE AT (3,3) - 80 EDGES |
| LOCAL_EDGE[79] | NON-DIRECTIONAL EDGE OF SUB-IMAGE AT (3,3) - 70 EDGES |

*FIG. 6*

DETECTION OF SOLID COLOR FRAMES FOR DETERMINING TRANSITIONS IN VIDEO CONTENT

BACKGROUND

Video content, such as television (TV) programs, often includes breaks within the video content, such as commercials. Cutting straight from the TV program to a commercial may be abrupt and not desirable. To transition to the breaks, different techniques may be used. For example, to provide a smooth transition, TV programs often include black or white frames to separate the commercials from the television content. Additionally, black or white frames may also be used to separate different commercials.

Certain services may leverage the use of black or white frames to perform a number of tasks. For example, the black or white frames may be used to determine commercial boundaries. Once the commercial boundaries are determined, the service may then perform some action, such as replacing the commercial.

BRIEF DESCRIPTION OF THE DRAWINGS

FIG. 6 shows an example of an edge histogram.

DETAILED DESCRIPTION

Described herein are techniques for black frame detection. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments detect a solid color frame, such as a black frame or a white frame, that may include visible content other than the solid color in a portion of the frame. These frames may conventionally not be detected as a solid color frame because of the visible content in the portion of the frame. However, these solid color frames may be "functional" black or white frames, in that the solid color frames are performing the function of the solid color frame even though the frames include the visible content. For example, the solid color frames are separator frames that are signaling a transition to a different type of content, such as from television or other content to an advertisement. The visible content may be content that may always be displayed on the screen, such as a ticker or logo, even if the video content is transitioning to an advertisement. Particular embodiments use techniques to detect the functional solid color frames even when visible content appears in the solid color frames, and also may detect false positive cases where the frame is detected as a solid color frame when visible content may be included in the solid color frame, but not detected. As will be described in more detail below, particular embodiments use color layout information and edge distribution information to detect solid color frames.

Figure 1:
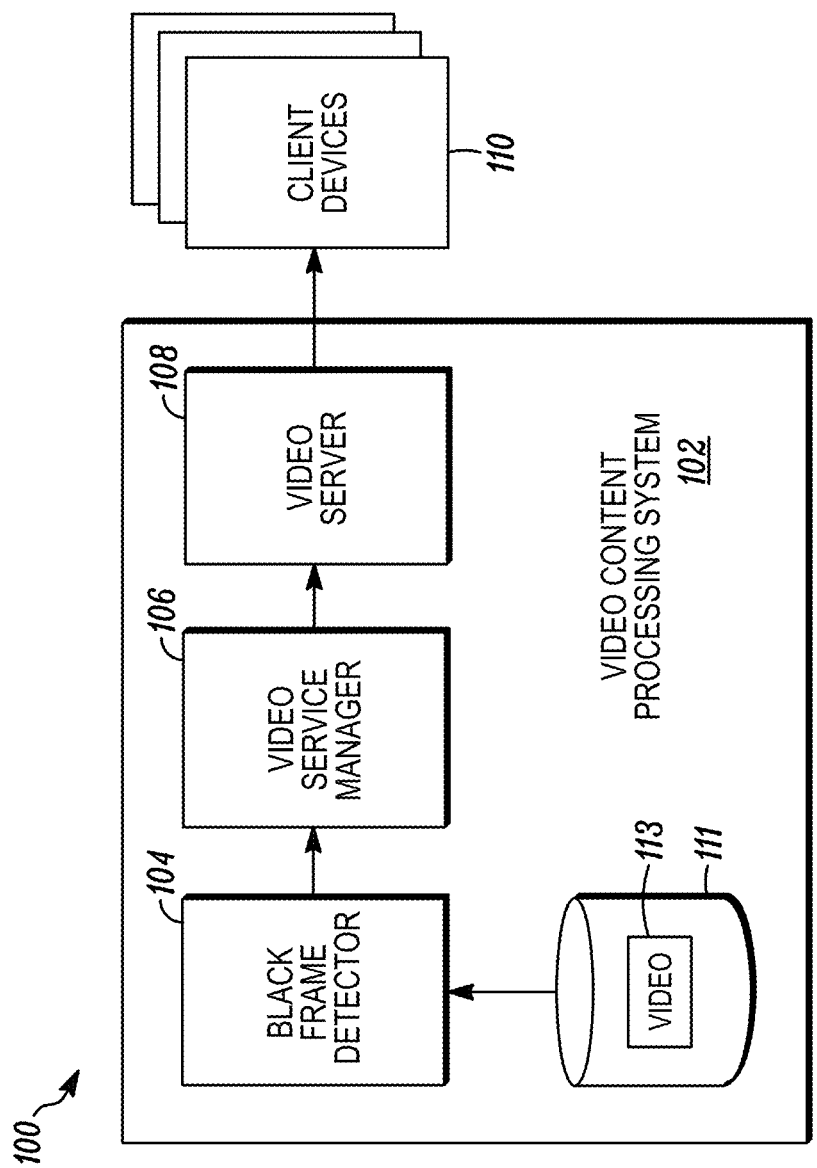
FIG. 1 depicts a simplified system including a video content processing system according to one embodiment.

FIG. 1 depicts a simplified system 100 including a video content processing system 102 according to one embodiment. Video content processing system 102 includes a black frame detector 104, a video service manager 106, and a video server 108. A black frame will be used for discussion purposes, but it will be understood that the black frame may be a white frame, or another frame that performs the function of a black frame. A black frame may be a frame that includes the solid color in a portion of the frame that is over a threshold, and is signaling a transition from one type of content to another. The first type of content may be a video program, and the second type of content may be inserted into the video content, such as advertisements. The black frame separates the first type of content and the second type of content, and particular embodiments may mark the black frame as a separator frame that indicates a transition from the first type of content to the second type of content. In some cases, further analysis may be needed to detect when some detected black frames may be false positives.

Black frame detector 104 receives a video 113 from storage 111. The video 113 may be any video content, such as a television program that is being broadcast to users or a program that is provided on-demand to users. Further, black frame detector 104 may process a video 113 that is being sent to one or more users in real time or in the background before the video 113 is sent to users.

Black frame detector 104 is configured to analyze frames of the video 113 to determine when a black frame is detected in the video 113. A frame is used for discussion purposes, and may mean a portion of the video 113, such as one image or one picture of the video 113. The output of black frame detector 104 may be metadata, such as a "1" or "0" for a frame, assuming "1" represents a black frame.

When black frame detector 104 detects a black frame, black frame detector 104 sends an identifier for the black frame to video service manager 106. The identifier may be a time, frame number, or other identification information that allows video service manager 106 to identify or mark the black frame in the video 113. Video service manager 106 may then perform a service based on receiving the identifier, such as detecting advertisement boundaries by combining the received identifier with other sources of information, such as short burst of silence, and replacing an advertisement in the video 113.

Video server 108 sends the video 113 to one or more client devices 110 being used by users, and uses the service provided by video service manager 106. For example, video service manager 106 may cause video server 108 to replace an advertisement that based on detecting the black frame. The black frame detection and service may be performed in real-time while video server 108 is sending the video 113 to client devices 110. In other embodiments, black frame detection may be performed prior to delivering the video 113 to client devices 110, and video service manager 106 determines if the service should be performed when the black frame is encountered while video server 108 is sending the video 113.

Black frame detector 104 may use color layout information and edge distribution information to determine the black frame. The color layout information may describe a distribution of color in the frame. Also, the edge distribution information may describe a number of directional edges found in different regions of the frame. Using the color layout information and edge distribution information, black frame detector 104 is able to detect black frames even when visible content is found in the black frames. Visible content may be content other than the solid color of black. Further, black frame detector 104 is able to identify false positives where a black frame may have been conventionally determined as a black frame, but includes visible content or strong color components within the frame.

The color layout information and edge distribution information may be found in descriptors for a video coding standard. These descriptors may be encoded by an encoder in an encoded bitstream that video server 108 is sending to clients 110. Alternatively, the color layout information and edge distribution information may be generated by processing decoded video frames and stored as metadata for the video 113. The descriptors may be included in the encoded bitstream. Clients 110 may include a decoder that can decode the bitstream as is known.

By using the descriptors, black frame detector 104 is able to use information that is always generated and included for any video being sent by video server 108. Also, black frame detector 104 can be inserted into the video delivery process to determine when black frames occur without requiring any extra information not already generated in the encoding process. Using the descriptors improves the functioning of system 102 to allow the system to detect black frames automatically and accurately. Also, black frame detector 104 provides the ability to quickly detect black frames in large numbers of different video programs.

Figure 2A:
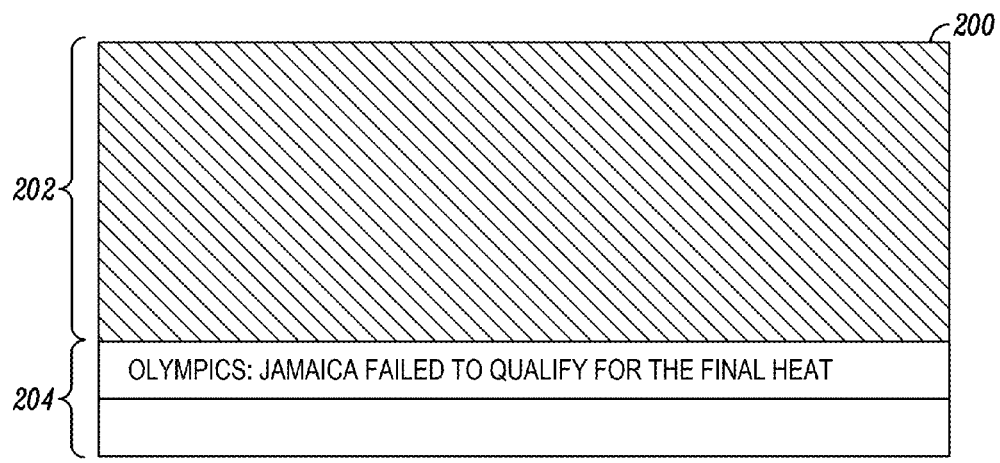
FIG. 2A shows an example of a black frame according to one embodiment.
Figure 2B:
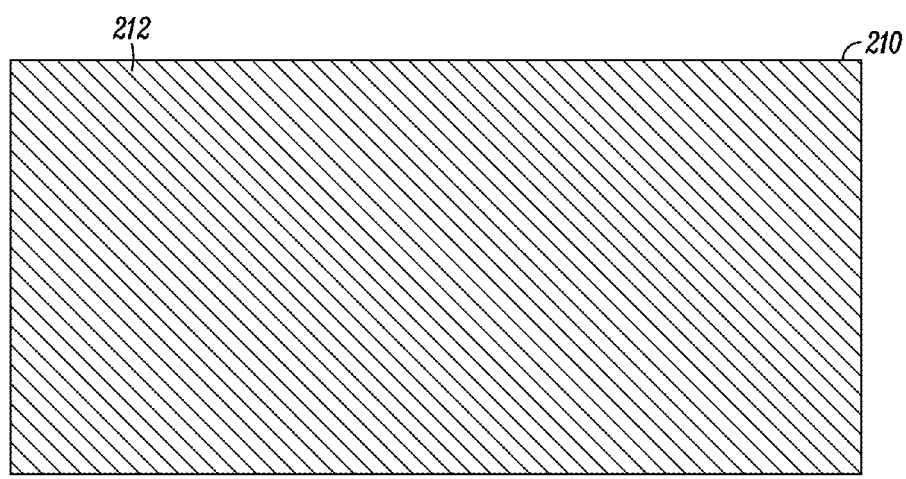
FIG. 2B shows an example of a non-black frame according to one embodiment.

The following describes examples that illustrate the black frame detection. FIG. 2A depicts detecting black frames, and FIG. 2B depicts detecting a false positive of a black frame. FIG. 2A shows an example of a black frame 200 according to one embodiment. A first portion 202 of frame 200 includes a solid color, such as the black color. The solid color is shown as slash marks in the figures. A second portion 204 shows visible content. Conventionally, because of the visible content shown in portion 204, frame 200 may not be detected as a black frame. This is because the visible content in frame 200 is included with the black solid color in portion 202.

The visible content in portion 204 may be included in all transitions from the video program to any advertisements. For example, the visible content in portion 204 may be a ticker. The video program may always include this ticker during transitions and possibly even when the advertisement is being shown to a user. Accordingly, a conventional black frame detector looking for a solid color in the entire frame may never detect that a black frame occurs if this ticker is never removed.

Particular embodiments may analyze the video 113 automatically to determine when visible content that may be included in functional black frames. The positioning of the visible content in functional black frames may vary in different video programs. Black frame detector 104 needs to know where to expect visible content in a functional black frame. Black frame detector 104 may automatically determine where the visible content is located or may receive input defining where the visible content is located. For example, black frame detector 104 may analyze frames before, during, and after advertisement breaks to determine that visible content is located in a certain area of frame 200 during transitions. This information is stored, and can be used by black frame detector 104 to detect if visible content found in a frame that is otherwise black means this frame is a functional black frame. Also, black frame detector 104 may receive input indicating that visible content may be located in the bottom portion of a frame during a transition. Also, although visible content is shown on the bottom of frame 200, different patterns of visible content may be appreciated, such as banners on a side of frame 200, logos, etc.

Although the visible content is shown in portion 204, particular embodiments use the color layout and edge distribution information to detect frame 200 as a functional black frame. If not detected as a black frame, this may be considered a false negative. In one embodiment, black frame detector 104 detects that frame 200 is a functional black frame, and the visible content in portion 204 may be a ticker (or other content) that is included in the black frame.

FIG. 2B shows an example of a non-black frame 210 according to one embodiment. Black frame 210 may be a regular frame in the video 113, but has a very dark background. However, conventionally, this may be detected as a black frame due to the very dark background and limited visible content. For example, although hard to see, visible content may be shown at 212 in a very light form. Due to the visible content being very light, conventional black frame detectors may not be able to detect the visible content and may consider frame 210 as a black frame. However, particular embodiments may avoid detecting frame 210 as a functional black frame. For example, black frame detector 104 may use the edge distribution information to detect the visible content in frame 210. As will be described below in more detail, the edge distribution may be more sensitive to lighting changes than the color layout information, and can be used to detect visible content or the lack of visible content as a supplement to the color layout information.

Figure 3:
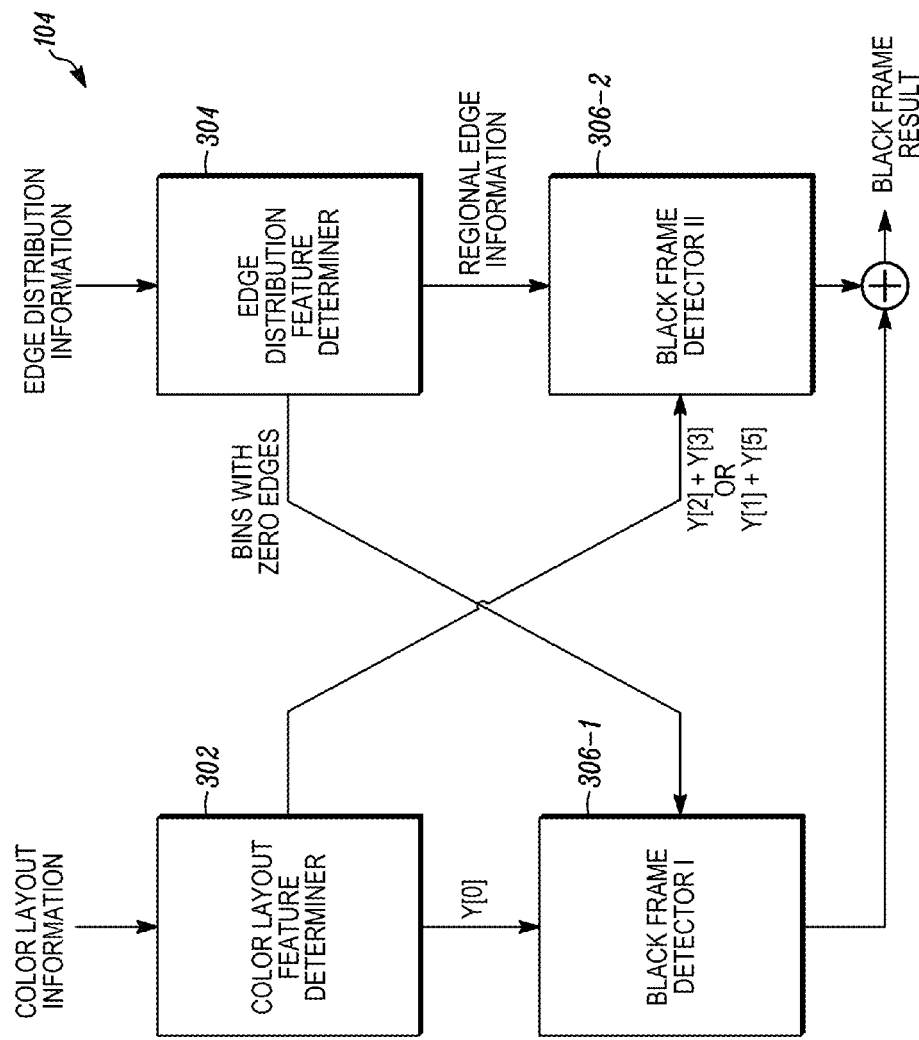
FIG. 3 depicts a more detailed example of a black frame detector according to one embodiment.

As discussed above, black frame detector 104 may use color layout information and edge distribution information to detect black frames according to one embodiment. FIG. 3 depicts a more detailed example of black frame detector 104 according to one embodiment. A color layout feature determiner 302 receives color layout information and can determine color layout features from the color layout information. Color layout information may describe a spatial distribution of color for a frame of the video 113. In one embodiment, the color layout information may be provided in a color layout descriptor from a video coding standard that indicates the spatial distribution of colors in a frame.

In one embodiment, the color layout information is described in discrete cosine transform (DCT) coefficients for the frame. In one embodiment, the color layout information uses a luminance (Y) and chroma (Cb and Cr) color space. An image is resized into a thumbnail-image, such as an 8×8 image (or other sizes), and the dominant color is calculated for the thumbnail-image. The DCT of the 8×8 matrix of color pixels is computed and quantized. This yields quantized DCT coefficients. Then, a zigzag scan is performed on the quantized DCT coefficients in order to preserve the most important coefficients. A person of skill in the art will appreciate the above process. Further, it will be recognized that other video coding standards may perform different methods to determine the quantized DCT coefficients.

The zigzag scan order organizes the coefficients in a certain order. Black frame color layout feature determiner 302 may then use certain coefficients found in the DCT coefficients to determine a distribution of color in the frame.

Figure 4A:
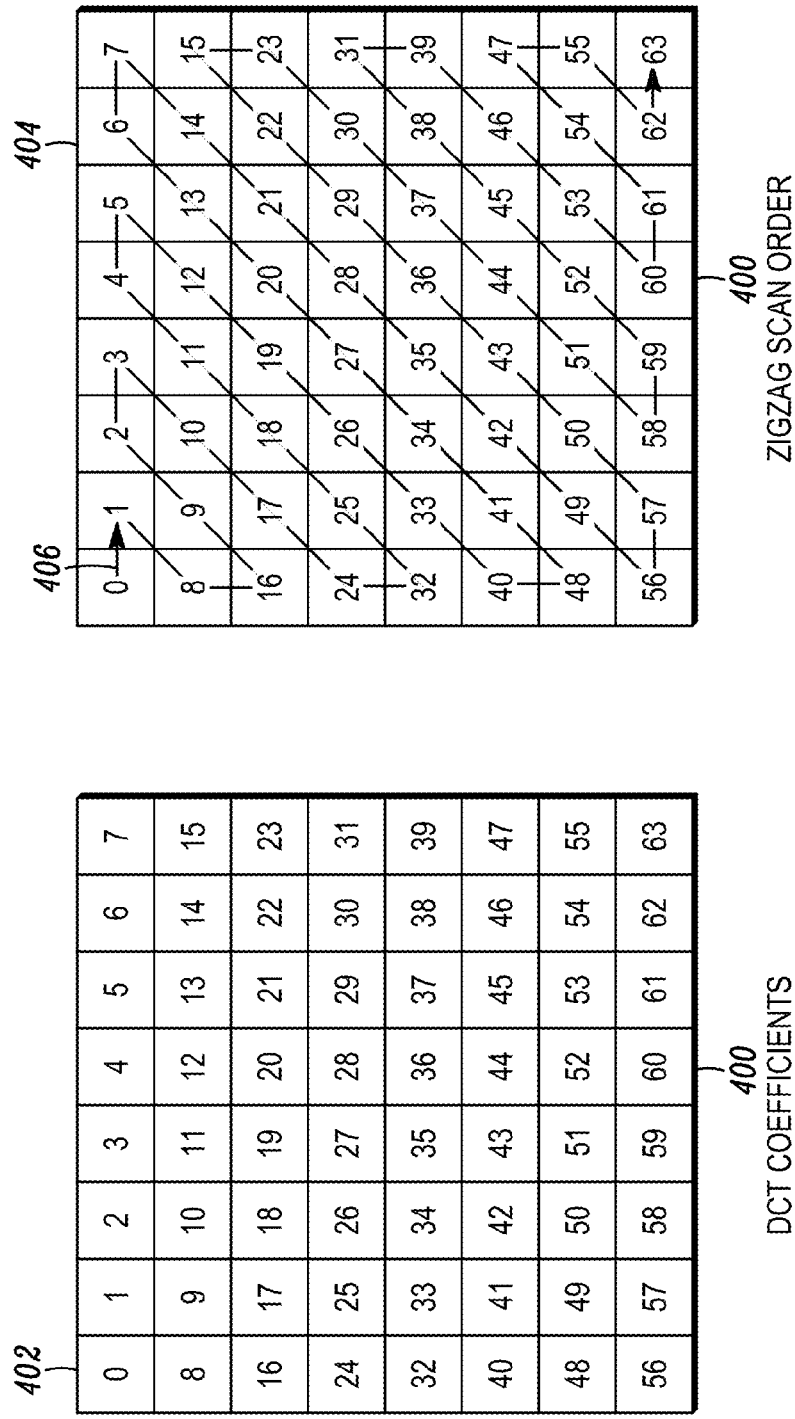
FIG. 4A shows an example of DCT coefficients in a sub-image of a frame.

For example, FIG. 4A shows an example of DCT coefficients in a thumbnail-image 400 of a frame. At 402, DCT coefficients are shown. In this case, 64 DCT coefficients may be included in the 8×8 thumbnail-image. The numbers 0-63 represent the identifier for the DCT coefficients, which may be different values based on the color distribution of the thumbnail-image.

At 404, the zigzag scan order is shown, but other scan orders may be appreciated. The zigzag scan order starts at coefficient 0 and moves to coefficient 1. Then from coefficient 1, the zigzag scan order continues to coefficient 8, then to coefficient 16, and then to coefficient 9, and so on, as shown by the line shown at 404. Due to this scan order, various coefficients may represent the color layout. For example, for the luminance plane (Y), the first six elements in the scan order are reserved as the six coefficients Y[0] to Y[5] for the color layout information. Coefficient Y[0] represents the average luminance level for the frame, and coefficients Y[1] through Y[5] represent the AC values, e.g., the change of luminance across the frame (which is represented by the thumbnail-image). For the chrominance plane (Cb and Cr), the first three elements in the scan order are reserved as Cb[0] to Cb[2] and Cr[0] to Cr[2] for the color layout information. All together, these twelve coefficients are provided in the color layout information, such as the color layout descriptor in a video coding standard.

Figure 4B:
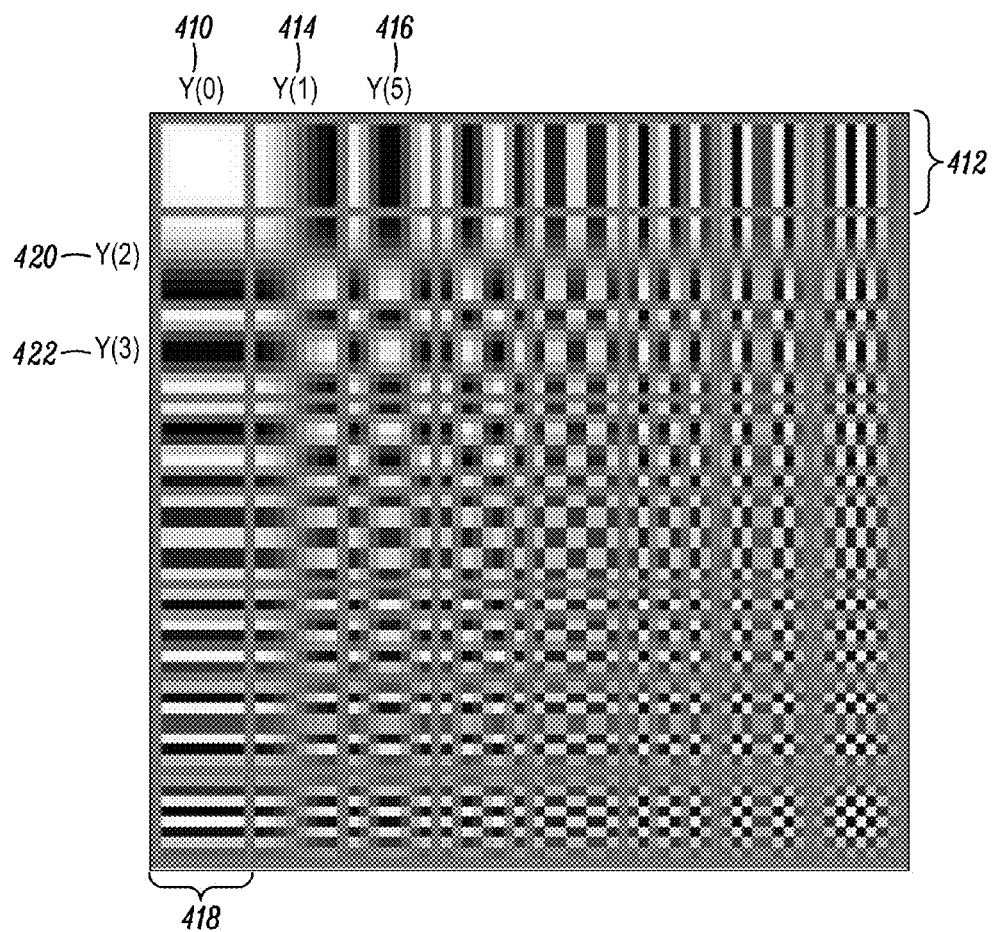
FIG. 4B shows an example of the color layout coefficient template for the DCT coefficients according to one embodiment.

FIG. 4B shows an example of the color layout coefficient template for the DCT coefficients according to one embodiment. This may be a template that shows what color distribution the coefficient represents. These are template values that are used to generate DCT coefficients 0-63. For example, 414 Y[1] includes 64 values, one for each pixel at the 8×8 thumbnail-image. By multiplying the pixel value with the corresponding template value, and summing up the 64 multiplication values, the Y[1] value is generated. Other coefficients are generated the same way using corresponding templates. For example, a coefficient Y[0] at 410 may show the average in luminance for the entire frame.

The row at 412 may be used to generate coefficients that are based on the horizontal luminance change in the thumbnail-image. For example, the coefficient Y[1] at 414 and the coefficient Y[5] at 416 may be used. The coefficients Y[1] and Y[5] respond to the horizontal luminance change in the thumbnail-image and can be used to detect the presence of a vertical portion of visible content in the thumbnail-image. Other coefficients in the row at 412 may also be used, but are not typically included in the color layout descriptor.

A column at 418 may be based on the vertical luminance change in the thumbnail-image. A coefficient Y[2] at 420 and a coefficient Y[3] at 422 show the vertical luminance change in the thumbnail-image. Other coefficients in the column at 418 may also be used, but are not typically included in the color layout descriptor.

When the transition from a black color to visible content vertically occurs, coefficients Y[2] and Y[3] may indicate this change. Similarly, when the transition from a black color to visible content occurs horizontally, coefficients Y[1] and Y[5] may indicate this change. The DCT coefficients may show that there is a vertical change in frame 200, but not exactly where the vertical change is. In this case, an edge distribution may be used to determine where edges are located in frame 200.

Referring back to FIG. 3, an edge distribution feature determiner 304 receives edge distribution information and can determine edge distribution features. The edge distribution information may describe a number of edges found in a plurality of regions of frame 200. For example, the edge distribution may be provided in an edge histogram descriptor described in a video coding standard. The edge histogram may indicate a number of edges in each block of sub-regions of frame 200. Using the edge distribution, particular embodiments can better locate where edges exist in image 200 to determine whether frame 200 should be a black frame even though it includes the visible content.

Figure 5:
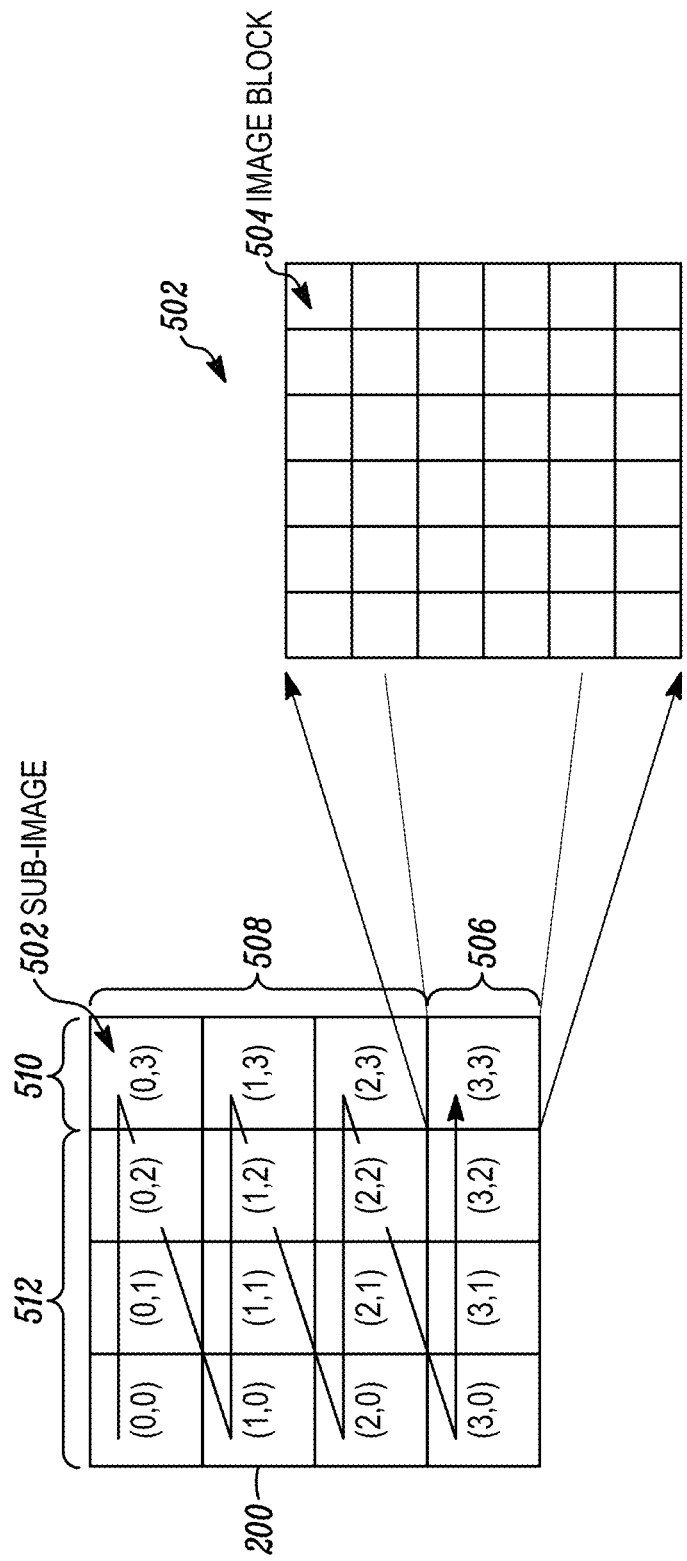
FIG. 5 shows examples of sub-images from a frame.

To describe the edge distribution in more detail, FIG. 5 shows examples of sub-images 502 from a frame 200. For example, frame 200 may be partitioned or divided into 16 sub-images 502. The sub-images are labeled as (0,0), (0,1), . . . , (3,3). Also, a sub-image 502 may be broken into a number of blocks 504. The number of image blocks depends on the sub-image size and block size.

The edges in each of the blocks 504 may be analyzed. For example, each block 504 may be analyzed to determine if it includes a vertical edge, horizontal edge, 45° edge, 135° edge, or a non-directional edge. Although these edges are described, other types of edges may also be used. In one embodiment, an edge mask may be used to analyze the edges in each image block 504. At each pixel in image block 504, a type of an edge is determined In another embodiment, a vertical edge, horizontal edge, 45° edge, 135° edge, or a non-directional edge is detected in each image block 504. Then, the number of edges for the different types of edges is totaled for each sub-image 502. That is, the number of vertical edges, horizontal edges, 45° edges, 135° edges, and non-directional edges for each sub-image 502 is totaled and stored to respect bins for the horizontal edges, vertical edges, 45° edges, 135° edges, and non-directional edges. If the pixel does not have an edge (e.g., it is a solid color), then no edge is recorded in any of the bins. The total count of each type of edge can be recorded for each sub-image 502. For example, if there are 40 horizontal edges found in pixels of a sub-image 502, the number 40 is recorded at the bin for horizontal edges. Similarly, if no horizontal edges at all occur in sub-image 502, the number 0 is recorded at the bin for horizontal edges.

The edge distribution results can be provided in bins of a histogram, or other data structure that can summarize an edge distribution. If the number of sub-images is 16, and the number of edge histogram bins per sub-image 502 is 5 (e.g., one bin for each type of edge in a sub-image), this makes the total number of 80 edge histogram bins for all sub-images 502. FIG. 6 shows an example of an edge histogram 600. In a column 602, the bins of the edge histogram are shown. Each sub-image 502 includes 5 bins. For example, at 604, the 5 bins Local_Edge[0]-Local_Edge[4] are the bins for sub-image (0,0). This continues until at 606, Local_Edge [75]-Local_Edge[79] show the 5 bins for sub-image (3,3). A column 608 may show the number of edges in each bin. For example, at 610, the number of vertical edges in sub-image (0,0) is 78 edges. It should be noted that if the number of vertical edges in sub-image (0,0) is 0, then this number is 0 as shown at 612 where 0 horizontal edges are found in sub-image (0,0). Other bins also include the number of edges.

Referring back to FIG. 5, if black frame detector 104 wants to detect if there is visible content in a portion of frame 200, because the edge distribution is broken up into sub-images, black frame detector 104 can focus on certain sub-regions of frame 200 to determine where the visible content is to determine portions of the frame that include edges. For example, if black frame detector 104 is looking to see if visible content is in a banner at the bottom portion of frame 200, black frame detector 104 can determine if edges are located in sub-images (3,0), (3,1), (3,2), and (3,3)

shown in a row at 506 in FIG. 5. Further, to make sure there are no edges in the upper portion of frame 200 (e.g., to see if the upper portion is a solid color), black frame detector 104 can look at the sub-images found in the rows shown at 508. In another embodiment, if black frame detector 104 is looking to see if visible content is in a banner at the side portion of frame 200, black frame detector 104 can determine if edges are located in sub-images (0,3), (1,3), (2,3), and (3,3) shown in a column at 510. Black frame detector 104 would then also make sure there are no edges located in the sub-images found in the other columns at 512.

Color layout feature determiner 302 and edge distribution feature determiner 304 may extract color layout features and edge distribution features from the color layout information and edge distribution information, respectively. For example, color layout feature determiner 302 may extract the color layout features for certain coefficients, such as Y[0], Y[2], and Y[3] if looking for a horizontal banner, or Y[0], Y[1], and Y[5] if looking for a vertical banner. Other coefficients may also be used. Further, edge distribution feature determiner 304 may extract the number of edges for sub-images 502 in frame 200. Depending on which region visible content is being searched for, edge distribution feature determiner 304 may determine a number of edges in different sub-images 502 in the edge histogram as will be described below.

In one embodiment, black frame detector 104 may perform different black frame detection tests. For example, a black frame detector I 306-1 and a black frame detector II 306-2 may perform different black frame detection processes, each of which may result in a separate detection of a black frame. In one example, black frame detector I 306-1 may detect whether a frame is black without any visible content and black frame detector II 306-2 may detect a black frame when visible content is found within a portion of the frame, but the frame should be considered a black frame irrespective of the detected visible content. Black frame detector I 306-1 and black frame detector II 306-2 may output a result in each separate detection of a black frame. In one embodiment, the result may be combined such that a detection of a black frame is output when either black frame detector I 306-1 or black frame detector II 306-2 determine a black frame exists. In another embodiment, multiple instance of black frame detector II 306-2 may be used. For example, one for detecting black frame that has a horizontal row of visible content at the bottom of the frame, another one for detecting black frame that has a vertical column of visible content at the left of the frame. In this embodiment, either black frame detector I 306-1 or any of the instance of black frame detectors 306-2 detects a black frame, the output will be a black frame.

Black frame detector I 306-1 is configured to detect whether frame 200 is all one color without any other visible content. To determine this, black frame detector I 306-1 receives coefficient Y[0] from the color layout and a number of edges for all the bins in the edge histogram. Coefficient Y[0] indicates a value of the luminance in the distribution of color within the entirety of frame 200. For example, if the coefficient has a sufficiently low number, this indicates the luminance is very low (e.g., darker or black) in the frame.

Black frame detector I 306-1 is also configured to determine how many edges are found in frame 200. In a black frame, the number of edges should be very low, such as most of blocks 504 in frame 200 should include 0 edges. For example, most of the bins in the edge histogram should include zero edges. Black frame detector I 306-1 uses the coefficient Y[0] and the number of edges in the edge histogram to determine if frame 200 is a black frame. For example, a low luminance number and a large number of bins that include zero edges in frame 200 indicate this is a black frame. In one embodiment, the number of zero edges bins may be close to 80 but may be not exactly, since there could be some information, such as a small logo or a television station number, that is located in a place unknown to the black frame detector, hence generating localized edges in some bins.

Black frame detector II 306-2 is configured to detect whether frame 200 is a functional black frame that includes visible content other than the black color. When looking for a horizontal row of visible content, a vertical luminance change and edges in the bottom row of frame 200 is tested. The vertical luminance change means a change in luminance moving in the vertical direction. To detect the vertical luminance change, black frame detector II 306-2 receives coefficients Y[2] and Y[3]. Also, to detect edges in the bottom portion of frame 200, black frame detector II 306-2 receives a number of edges for a set of sub-images 502 in frame 200. For example, if visible content is allowed in a bottom portion of frame 200, then black frame detector II 306-2 receives edge statistics for sub-images (3,0), (3,1), (3,2), and (3,3). Also, black frame detector II 306-2 detects whether the upper portion of frame 200 does not include many edges. To detect this, black frame detector II 306-2 receives the edge statistics for the sub-images in the upper rows shown at 508 in FIG. 5. On the other hand, if a vertical column of visible content is to be detected, black frame detector II 306-2 receives coefficients Y[1] and Y[5], and edge statistics for a vertical column of sub-images, such as the column shown at 510 in FIG. 5. Coefficients Y[1] and Y[5] show the horizontal change in luminance. However, for discussion purposes, the horizontal row of visible content will be used.

Black frame detector II 306-2 then analyzes the coefficients Y[2] and Y[3] to determine if there is a vertical luminance change in frame 200. When there is, edge statistics are analyzed for sub-images 502 to detect the location of this vertical luminance change. For example, black frame detector II 306-2 may analyze the sub-images (3,0), (3,1), (3,2), and (3,3) in a row at 506 shown in FIG. 5 to determine the number of edges found in each of these sub-images 502. Also, black frame detector II 306-2 may analyze the upper sub-images in the rows shown at 508 to determine if this region does not include many, or any, edges. In this case, black frame detector II 306-2 is determining whether the top ¾ portion of frame 200 includes a very low number of edges and the bottom ¼ portion of frame 200 includes a larger number of edges. This may indicate that the visible content may be isolated to the bottom region of frame 200, which is consistent with the banner that may be included on a black frame. If the visible content is isolated in the bottom region and the luminance change indicates a vertical luminance change, and also the top region of frame 200 indicates a low number of edges, then black frame detector II 306-2 may determine that frame 200 is a functional black frame. The above are just two examples of dealing with functional black frames that have visible content in it. Particular embodiments can detect black frames that only allow visible content in different designated regions of the frame by combining the test for color layout information and edge histogram information.

In another example, black frame detector II 306-2 may detect a false positive. In this case, black frame detector II 306-2 determines from coefficients Y[1], Y[2], Y[3], and Y[5] if there is a vertical and/or horizontal luminance change. In some cases, with a dark background, the luminance change may be very faint. Thus, using the luminance coefficients may not be sensitive enough to determine whether this frame is a black frame. The edge detection may be more sensitive to lighting changes and can detect edges even when the luminance change is faint. Black frame detector II 306-2 determines if edges exist in all of the sub-images 502 (or a portion of the sub-images). This may indicate that there is content in the black frame even though the vertical luminance change is small. This may indicate that this is not a black frame and black frame detector II 306-2 may determine that frame 200 is not a black frame.

Black frame detector I 306-1 may use thresholds to determine whether frame 200 is a black frame. For example, a black frame is detected when coefficient $Y[0]<T_{y0}$ and $NumZero_1>T_{nz1}$, where $T_{y0}$ and $T_{nz1}$ are pre-determined threshold values, Y[0] is a first coefficient of the color layout, and $NumZero_1$ is a sum of the number of bins among the 80 bins in the 16 sub-images of the edge distribution that include 0 edges or another low number indicating a lack of edges. The value for threshold $T_{y0}$ may be a value that indicates that the luminance is sufficiently dark to consider frame 200 a black frame. The value $T_{nz1}$ may be a value such that the number of edges in bins of sub-images in frame 200 is low enough that frame 200 can be considered a black frame. In essence, these tests are determining whether frame 200 is sufficiently dark with little luminance changes and a very few number of edges. In one embodiment, $T_{y0}$ is set to 5.0, and $T_{nz1}$ is set to 75.

Black frame detector II 306-2 may detect a frame as being a black frame when:
1. absolute value $abs(Y[2]-16)>T_{y2}$ and $abs(Y[3]-16)>T_{y3}$, where Y[k] are coefficients from the color layout, and $T_{y2}$ and $T_{y3}$ are pre-determined thresholds;
2. $NumEdge>T_{NE}$, where NumEdge is a total number of non-zero edges in a bottom region of the edge distribution, such as the bottom portion of frame 200, and $T_{NE}$ is a pre-determined threshold; and
3. $NumZero_2>T_{NZ2}$, where $NumZero_2$ is the total number of bins with 0 edges in the top region of the edge distribution and $T_{NZ2}$ is a threshold.

For the first equation, note that after quantization for the DCT coefficients of luminance values, the neutral value (e.g., coefficient value to be 0) comes at 16. This is why 16 is subtracted from the value of coefficient Y[k]. However, if different values for the coefficients are used, the number 16 may not need to be subtracted from the coefficient. The threshold values $T_{y2}$ and $T_{y3}$ are used to determine whether there is a change in luminance that is above a value. This indicates that there may be visible content somewhere in frame 200 and this content is a change in vertical luminance because coefficients Y[2] and Y[3] are used.

For the second equation, the variable NumEdge is the count of edges in a certain region of frame 200, such as the sub-images (3,0), (3,1), (3,2), and (3,3) shown in the bottom ¼ region. By counting the number of edges in this region, it can be determined if there is visible content in the bottom region. The threshold $T_{NE}$ may be a threshold set such that it can be determined whether there are enough edges in the bottom region that visible content can be determined to be found in this region.

For the third equation, $NumZero_2$ is the total number of bins that include 0 edges in the top ¾ region of frame 200. It will be appreciated that a small number of edges may be allowed. The threshold $T_{NZ2}$ is set such that a majority of the top ¾ region includes no edges. In this case, it can be determined that the top ¾ of the region is mostly black.

Accordingly, the three equations indicate that the top ¾ region of frame 200 is black and the bottom ¼ region includes visible content. In this case, black frame detector II 306-2 can determine that this may be a functional black frame as shown in FIG. 2A.

The same concept above can be used to detect a white frame. In this case, the values may be changed such that the white frame can be detected where the coefficient Y[0] may be sufficiently high which indicates a high luminance instead of a sufficiently dark luminance.

In another embodiment, the same concept can be used to detect any frame that includes a solid (uniform) color, with visible content at certain regions.

Figure 7:
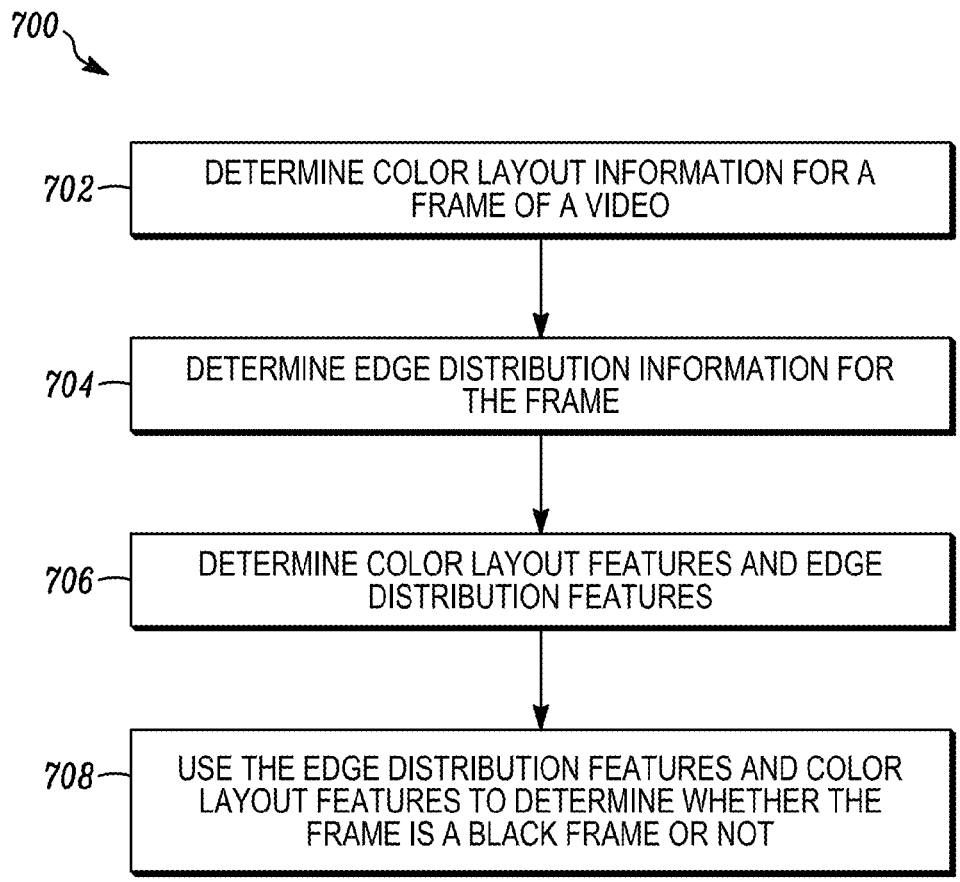
FIG. 7 depicts a simplified flowchart of a method for determining a black frame according to one embodiment.

FIG. 7 depicts a simplified flowchart 700 of a method for determining a black frame according to one embodiment. At 702, black frame detector 104 determines color layout information for a frame 200 of a video 113. The color layout information describes a distribution of color in the frame. As described above, different DCT coefficients may be determined.

At 704, black frame detector 104 determines edge distribution information for frame 200. The edge distribution information describes a number of edges in different regions of frame 200. As described above, an edge histogram for sub-images 502 may be determined At 706, black frame detector 104 determines color layout features and edge distribution features. At 708, black frame detector 104 uses the edge distribution features and color layout features to determine whether frame 200 is a black frame or not.

Accordingly, particular embodiments provide a process for determining whether a frame 200 is a black frame or not. Color layout information and edge distribution information is used. The edge distribution information describes a local edge distribution over the luminance image. The edge distribution offers complementary information of localized texture properties to the color layout information. The edge distribution similarity measures may be noisier because local edges are very sensitive to lighting and motion. The edge distribution may be used as a measure of content variance over the image in terms of the number of bins with 0 edges and a total number of edges in certain bins. The edge distribution provides an independent regional description, which makes it useful to determine visible content in a specific area of image 200.

In other embodiments, color layout information and edge distribution information may be obtained from a region based image process. For example, particular embodiments partition the whole frame into 16 sub-images, and apply color space conversion and edge detection to each sub-image in order to obtain the number of edge pixels and average color components. For black frame detector II, on most regions the luminance may be sufficiently close to (or below) the dark level (which is typically 16 for 8-bit image), and the number of edge pixels may be close to zero unless on regions that visible content is allowed. In one embodiment, the target color space could be YUV (one luma (Y) and two chroma (UV) or HSV (Hue saturation value) where the luminance is separated from the color components. The edge detection method could be Canny, Sobel, or custom edge detection methods. One custom method includes comparing pixel value with one of its 8 spatial neighbors at different color channels, and if the maximum absolute difference across of all neighbors across all color channels is greater than a threshold, the pixel is determined to be an edge pixel.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for determining transitions in video content, the method comprising:
   determining color layout information for a frame of the video content, the color layout information describing a distribution of color in the frame;
   determining edge distribution information for the frame, the edge distribution information describing a number of edges found in a plurality of regions of the frame;
   determining a set of color layout features from the color layout information regarding a color change within the frame;
   determining a set of edge distribution features from the edge distribution information in a set of regions in the plurality of regions, wherein the set of edge distribution features indicate a number of edges in the set of regions;
   determining whether the frame is classifiable as a solid color frame based on the set of color layout features and the set of edge distribution features; and
   when the frame is classifiable as the solid color frame, marking the solid color frame being a transition between a first type of video content and a second type of video content;
   wherein determining whether the frame is classifiable as a solid color frame comprises:
      determining when a first color layout feature in the set of color layout features indicates a luminance of the frame is below a first color layout threshold;
      determining when the number of edges in the set of edge distribution features for the plurality of regions is below a first edge threshold;
      determining when a second color layout feature in the set of color layout features indicates a change in luminance of the frame is above a second color layout threshold;
      determining when the number of edges in the set of edge distribution features for the set of regions is above a second edge threshold; and
      determining when the number of edges for regions not in the set of regions includes a number of bins including zero edges that is above a third edge threshold.

2. The method of claim 1, wherein the frame is classified as the solid color frame when visible content other than a color of the solid color frame exists in the set of regions in the frame.

3. The method of claim 2, wherein the visible content is not in regions other than the set of regions.

4. The method of claim 1, wherein the frame is not classified as the solid color frame when visible content other than a color of the solid color frame exists in regions other than the set of regions in the frame.

5. The method of claim 1, wherein:
   the first color layout feature is a first coefficient in a scan order of discrete cosine transform (DCT) coefficients for the frame.

6. The method of claim 1, wherein:
   the number of edges comprises a number that indicates no edges are found in portions of the plurality of regions.

7. The method of claim 1, wherein:
   the second color layout feature is a second coefficient or third coefficient in a scan order of discrete cosine transform (DCT) coefficients for the frame.

8. The method of claim 1, wherein:
   the second color layout feature is a first coefficient or fifth coefficient in a scan order of discrete cosine transform (DCT) coefficients for the frame.

9. The method of claim 1, wherein determining when the frame is classified as the solid color frame comprises:
   performing a first test to determine when a first color layout feature in the set of color layout features and the set of edge distribution features indicate the frame includes a solid color in the plurality of regions; and
   performing a second test to determine when a second color layout feature in the set of color layout features and the set of edge distribution features indicate visible content other than the solid color is found in the set of regions and not in regions other than the set of regions.

10. The method of claim 1, wherein the solid color frame comprises a black color frame or a white color frame.

11. A method for determining transitions in video content, the method comprising:
   determining color layout information for a frame of the video content, the color layout information describing a distribution of color in the frame;
   determining edge distribution information for the frame, the edge distribution information describing a number of edges found in a plurality of regions of the frame;
   determining a set of color layout features from the color layout information regarding a color change within the frame;
   determining a set of edge distribution features from the edge distribution information in a set of regions in the plurality of regions, wherein the set of edge distribution features indicate a number of edges in the set of regions;
   determining whether the frame is classifiable as a solid color frame based on the set of color layout features and the set of edge distribution features; and
   when the frame is classifiable as the solid color frame, marking the solid color frame being a transition between a first type of video content and a second type of video content;
   wherein determining whether the frame is classifiable as a solid color frame comprises:

determining when a first color layout feature in the set of color layout features indicates a luminance of the frame is below a first color layout threshold;
determining when the number of edges in the set of edge distribution features for the plurality of regions is below a first edge threshold;
determining when a second color layout feature in the set of color layout features indicates a change in luminance of the frame is above a second color layout threshold;
determining when the number of edges in the set of edge distribution features for the set of regions is above a second edge threshold; and
determining when a third color layout feature in the set of color layout features indicates the change in luminance of the frame is above a third color layout threshold.

12. The method of claim 11, wherein the frame is classified as the solid color frame when visible content other than a color of the solid color frame exists in the set of regions in the frame.

13. The method of claim 11, wherein the frame is classified as the solid color frame when visible content other than a color of the solid color frame exists in the set of regions in the frame.

14. The method of claim 11, wherein the frame is not classified as the solid color frame when visible content other than a color of the solid color frame exists in regions other than the set of regions in the frame.

15. The method of claim 11, wherein:
the first color layout feature is a first coefficient in a scan order of discrete cosine transform (DCT) coefficients for the frame.

16. The method of claim 11, wherein:
the number of edges comprises a number that indicates no edges are found in portions of the plurality of regions.

17. The method of claim 11, wherein:
the second color layout feature is a second coefficient or third coefficient in a scan order of discrete cosine transform (DCT) coefficients for the frame.

18. The method of claim 11, wherein:
the second color layout feature is a first coefficient or fifth coefficient in a scan order of discrete cosine transform (DCT) coefficients for the frame.

19. The method of claim 11, wherein determining when the frame is classified as the solid color frame comprises:
performing a first test to determine when a first color layout feature in the set of color layout features and the set of edge distribution features indicate the frame includes a solid color in the plurality of regions; and
performing a second test to determine when a second color layout feature in the set of color layout features and the set of edge distribution features indicate visible content other than the solid color is found in the set of regions and not in regions other than the set of regions.

20. The method of claim 11, wherein the solid color frame comprises a black color frame or a white color frame.

21. A system for determining transitions in video content, the system comprising:
a solid color frame detector comprising one or more computer processors to be communicatively coupled to a storage device storing the video content, the one or more computer processors further configured for:
receiving the video content from the storage device;
determining color layout information for a frame of the video content, the color layout information describing a distribution of color in the frame;
determining edge distribution information for the frame, the edge distribution information describing a number of edges found in a plurality of regions of the frame;
determining a set of color layout features from the color layout information regarding a color change within the frame;
determining a set of edge distribution features from the edge distribution information in a set of regions in the plurality of regions, wherein the set of edge distribution features indicate a number of edges in the set of regions;
determining whether the frame is classifiable as a solid color frame based on the set of color layout features and the set of edge distribution features; and
when the frame is classifiable as the solid color frame, marking the solid color frame as a transition between a first type of video content and a second type of video content;
wherein determining whether the frame is classifiable as a solid color frame comprises:
determining when a first color layout feature in the set of color layout features indicates a luminance of the frame is below a first color layout threshold;
determining when the number of edges in the set of edge distribution features for the plurality of regions is below a first edge threshold;
determining when a second color layout feature in the set of color layout features indicates a change in luminance of the frame is above a second color layout threshold;
determining when the number of edges in the set of edge distribution features for the set of regions is above a second edge threshold; and
determining when the number of edges for regions not in the set of regions includes a number of bins including zero edges that is above a third edge threshold;
a video service manager comprising one or more computer processors configured for receiving the video content comprising the solid color frame, and performing a service on the video content based on the transition between a first type of video content and a second type of video content to produce serviced video content, the one or more computer processors of the video service manager further configured to provide the serviced video content to a video server configured for sending the serviced video content to a client device.

22. The system of claim 21, wherein the frame is classified as the solid color frame when visible content other than a color of the solid color frame exists in the set of regions in the frame.

23. A method for determining transitions in video content, the method comprising:
determining a set of color layout features from color layout information regarding a color change within a frame of the video content;
determining a set of edge distribution features from edge distribution information in a set of regions of a plurality of regions in the frame, wherein the set of edge distribution features indicate a number of edges in the set of regions;
performing a first test to determine when a first color layout feature in the set of color layout features and the set of edge distribution features indicate the frame includes a solid color in the plurality of regions;

performing a second test to determine when a second color layout feature in the set of color layout features and at least a portion of the set of edge distribution features indicate visible content other than the solid color is found in the set of regions and not in regions other than the set of regions;

determining whether the frame is classifiable as a solid color frame based at least on the first test or the second test, and wherein determining whether the frame is classifiable as a solid color frame further comprises:

determining when a first color layout feature in the set of color layout features indicates a luminance of the frame is below a first color layout threshold;

determining when the number of edges in the set of edge distribution features for the plurality of regions is below a first edge threshold;

determining when a second color layout feature in the set of color layout features indicates a change in luminance of the frame is above a second color layout threshold;

determining when the number of edges in the set of edge distribution features for the set of regions is above a second edge threshold; and determining when a third color layout feature in the set of color layout features indicates the change in luminance of the frame is above a third color layout threshold; and when the frame is classified as the solid color frame, marking the solid color frame as a transition between a first type of content and a second type of content.

24. The method of claim 23, wherein when either the first test or the second test indicates the frame is classified as the solid color frame, outputting an indication that the frame is the solid color frame.

25. The method of claim 23, wherein:
the first color layout feature is a zero coefficient in a scan order of discrete cosine transform (DCT) coefficients for the frame, and
the second color layout feature is a second coefficient or third coefficient in the scan order of discrete cosine transform (DCT) coefficients for the frame or the second color layout feature is a first coefficient or fifth coefficient in the scan order of discrete cosine transform (DCT) coefficients for the frame.

26. The method of claim 23, wherein the at least a portion of the set of edge distribution features comprises a row or column of edge distribution features.

\* \* \* \* \*